(12) United States Patent
Al-Alloush et al.

(10) Patent No.: US 10,899,972 B1
(45) Date of Patent: Jan. 26, 2021

(54) FLUID CATALYTIC CRACKING OF PETROLEUM OIL WITH REDUCED EMISSIONS

(71) Applicant: Saudi Arabian Oil Company, Dhahran (SA)

(72) Inventors: Saeed Al-Alloush, Dammam (SA); Othman Taha, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/719,502

(22) Filed: Dec. 18, 2019

(51) Int. Cl.
| | | |
|---|---|---|
| *C10G 11/18* | (2006.01) | |
| *B01J 8/18* | (2006.01) | |
| *B01J 8/26* | (2006.01) | |
| *B01J 29/08* | (2006.01) | |

(52) U.S. Cl.
CPC ........... *C10G 11/187* (2013.01); *B01J 8/1809* (2013.01); *B01J 8/1881* (2013.01); *B01J 8/26* (2013.01); *B01J 29/088* (2013.01); *C10G 2300/405* (2013.01); *C10G 2300/70* (2013.01)

(58) Field of Classification Search
None
See application file for complete search history.

(56) References Cited

U.S. PATENT DOCUMENTS

| | | | |
|---|---|---|---|
| 9,597,664 B2 * | 3/2017 | Chigapov | .......... B01D 53/9422 |
| 9,701,914 B2 | 7/2017 | Khan et al. | |
| 9,764,314 B2 | 9/2017 | Al-Alloush et al. | |
| 9,765,262 B2 | 9/2017 | Taha et al. | |
| 9,890,334 B2 | 2/2018 | Harandi et al. | |
| 2003/0006168 A1 | 1/2003 | Ino et al. | |
| 2009/0095657 A1 * | 4/2009 | Taha | .................... C10G 11/187 208/113 |

OTHER PUBLICATIONS

Sheppard et al., "Related Feedstock Composition to Product Slate and Composition in Catalytic Cracking. 6. Feedstocks Derived from Merey, a Venezuelan Crude," Energy and Fuels, vol. 17, 2003, 7 pages.

* cited by examiner

*Primary Examiner* — Tam M Nguyen
(74) *Attorney, Agent, or Firm* — Fish & Richardson P.C.

(57) ABSTRACT

A method for fluid catalytic cracking (FCC) of petroleum oil feedstock includes reacting the petroleum oil feedstock with a catalyst mixture in a reaction zone of an FCC unit to obtain a product stream including desulfurized hydrocarbon product, unreacted petroleum oil feedstock, and spent catalyst. During the reacting a process control system develops a process model based on data collected during the reacting, the process model characterizing a relationship among the feed rate of the base cracking catalyst, the feed rate of the FCC additive, the operating conditions, the composition of the product stream, and emissions from the reaction; and one or more of (i) a target feed rate of the base cracking catalyst, (ii) a target feed rate of the FCC additive, and (iii) one or more target operating conditions of the reaction in the reaction zone to reduce the emissions from the FCC unit and to increase a yield of the desulfurized hydrocarbon product in the product stream are determined.

20 Claims, 4 Drawing Sheets

FLUID CATALYTIC CRACKING OF PETROLEUM OIL WITH REDUCED EMISSIONS

BACKGROUND

In catalytic cracking of petroleum oil, a fluid catalytic cracking (FCC) unit cracks petroleum-derived hydrocarbons using a catalyst to produce products such as gasoline, liquefied petroleum gas (LPG), and cracked gas oil. Production of higher value light-fraction olefins, such as propylene, in an FCC unit can be increased by increasing the temperature of the FCC reaction or by including a zeolite-containing additive, such as ZSM-5, which selectively converts primary cracking products such as gasoline into light-fraction olefins. Addition of phosphorous can enhance the activity and selectivity of zeolite-containing additives.

SUMMARY

This disclosure relates to real-time, closed-loop monitoring, optimization, and control of fluid catalytic cracking (FCC) of petroleum oil into light-fraction higher value products, such as desulfurized products, such as gasoline or light-fraction olefins. The optimization, which is performing using process models developed using real-time or historical data indicative of process parameters or operating conditions or both, is applied to adjust process parameters or operating conditions or both to achieve maximization of the production of light-fraction higher value products and the minimization of unwanted emissions of dry gases such as SOx, NOx, CO, CO2. For instance, the optimization can adjust process parameters, operating conditions, or both to help ensure complete combustion, thereby minimizing emissions such as CO emissions. The process models are statistical models linking process parameters and operating conditions, and are developed based on actual process data, such as real-time data from a current process, historical data, or both, that indicate process parameters, operating conditions, or both.

In an aspect, a method fluid catalytic cracking (FCC) of petroleum oil feedstock includes reacting the petroleum oil feedstock with a catalyst mixture in a reaction zone of an FCC unit to obtain a product stream including desulfurized hydrocarbon product, unreacted petroleum oil feedstock, and spent catalyst. The catalyst mixture includes a base cracking catalyst including a stable Y-type zeolite and a rare earth metal oxide, and an FCC additive including a shape selective zeolite. The method includes during the reacting, collecting, from sensors of the FCC unit, data indicative of one or more of (i) a feed rate of one or more of the base cracking catalyst, the FCC additive, or the petroleum oil feedstock, (ii) operating conditions of the reaction in the reaction zone, or (iii) a composition of the product stream. The method includes during the reacting, collecting, from an emissions sensor, data indicative of gas emissions from the reaction. The method includes during the reacting, developing, by a process control system including one or more processors, a process model based on at least some of the collected data, in which the process model characterizes a relationship among the feed rate of the base cracking catalyst, the feed rate of the FCC additive, the operating conditions, the composition of the product stream, and emissions from the reaction. The method includes during the reacting, based on a comparison between at least some of the collected data and the developed process model or a previously developed process model, determining, by the process control system, one or more of (i) a target feed rate of the base cracking catalyst, (ii) a target feed rate of the FCC additive, and (iii) one or more target operating conditions of the reaction in the reaction zone to reduce the emissions from the FCC unit and to increase a yield of the desulfurized hydrocarbon product in the product stream. The method includes adjusting one or more of (i) the feed rate of the base cracking catalyst according to the determined target feed rate of the base cracking catalyst, (ii) the feed rate of the FCC additive according to the determined target feed rate of the FCC additive, or (iii) the operating conditions according to the determined one or more target operating conditions.

Embodiments can include one or any combination of the following features.

The catalyst mixture includes between 55 wt. % and 95 wt. % of the base cracking catalyst and between 5 wt. % and 45 wt. % of the FCC additive.

The base cracking catalyst includes less than 0.5 wt. % of the rare earth metal oxide.

The catalyst mixture includes a phosphorous-containing compound.

The FCC additive includes ZSM-5.

Determining one or more target operating conditions of the reaction includes determining a target reaction zone outlet temperature, including determining the target reaction zone outlet temperature to be between 500° C. and 650° C., such as between 580° C. and 630° C.

Determining one or more target operating conditions of the reaction includes determining a target contact time for contact between the petroleum oil feedstock and the catalyst mixture in the reaction zone, including determining the target contact time to be between 0.05 seconds and 3.0 seconds, such as between 0.1 and 1.5 seconds.

Determining the target feed rate of the base cracking catalyst includes determining a target weight ratio of the base cracking catalyst to the petroleum oil feedstock in the reaction zone, including determining the target weight ratio to be between 10 and 45.

The determining to reduce the emissions from FCC unit includes determining one or more of (i), (ii), and (iii) to reduce emissions of SOx, NOx, or both.

The method includes developing the process model based on a temperature of a regeneration zone of the FCC unit.

The method includes determining, based on the comparison, a target temperature of a regeneration zone of the FCC unit.

The method includes developing one or more of the process models based further on historical data collected from sensors of the FCC unit.

The method includes reacting the petroleum oil feedstock with the catalyst mixture in a downflow type reaction zone.

The method includes separating the desulfurized hydrocarbon product from the unreacted petroleum oil feedstock and the spent catalyst in a separation zone of the FCC unit.

The method includes recycling the unreacted petroleum oil feedstock to the reaction zone.

In an aspect, a system for fluid catalytic cracking (FCC) of petroleum oil feedstock includes a reaction zone for reacting the petroleum oil feedstock with a catalyst mixture in a reaction zone of an FCC unit to obtain a product stream including desulfurized hydrocarbon product, unreacted petroleum oil feedstock, and spent catalyst, the catalyst mixture including: a base cracking catalyst including a stable Y-type zeolite and a rare earth metal oxide, and an FCC additive including a shape selective zeolite. The system includes process sensors for collecting, during a reaction in the reaction zone, data indicative of one or more of (i) a feed rate of one or more of the base cracking catalyst into the reaction zone, the FCC additive into the reaction zone, or the petroleum oil feedstock, (ii) operating conditions of the reaction in the reaction zone, or (iii) a composition of the product stream; and an emissions sensor for collecting data indicative of emissions from the FCC reaction. The system includes a process control system including one or more processors coupled to a memory and configured to develop, during the reaction in the reaction zone, a process model based on at least some of the collected data, in which the process model characterizes a relationship among the feed rate of the base cracking catalyst, the feed rate of the FCC additive, the operating conditions, the composition of the product stream, and emissions from the FCC reaction; based on a comparison between at least some of the collected data and one or more of the developed process models, determine, during the reaction in the reaction zone, one or more of (i) a target feed rate of the base cracking catalyst, (ii) a target feed rate of the FCC additive, and (iii) one or more target operating conditions of the reaction in the reaction zone to reduce the emissions from the FCC unit and to increase a yield of the desulfurized hydrocarbon product in the product stream; and control adjustment of one or more of (i) the feed rate of the base cracking catalyst according to the determined target feed rate of the base cracking catalyst, (ii) the feed rate of the FCC additive according to the determined target feed rate of the FCC additive, or (iii) the operating conditions according to the determined one or more target operating conditions.

Embodiments can include one or any combination of the following features.

The system includes a regeneration zone for regeneration of the spent catalyst. The process control system is configured to develop the process model based on a temperature of the regeneration zone. The process control system is configured determine, based on the comparison, a target temperature of the regeneration zone.

The system includes a catalyst hopper for providing the base cracking catalyst to the reaction zone.

The system includes a separation zone for separating the desulfurized hydrocarbon product from the unreacted petroleum oil feedstock and the spent catalyst.

The system includes a fractionation unit for fractionation of the desulfurized hydrocarbon product.

The system includes a conduit for recycling unreacted petroleum oil feedstock to the reaction zone.

Determining one or more target operating conditions of the reaction includes determining a target reaction zone outlet temperature. The process control system is configured to determine the target reaction zone outlet temperature to be between 500° C. and 650° C., such as between 580° C. and 630° C.

Determining one or more target operating conditions of the reaction includes determining a target contact time for contact between the petroleum oil feedstock and the catalyst mixture in the reaction zone. The process control system is configured to determine the target contact time to be between 0.05 seconds and 3.0 seconds, such as between 0.1 and 1.5 seconds.

Determining the target feed rate of the base cracking catalyst includes determining a target weight ratio of the base cracking catalyst to the petroleum oil feedstock in the reaction zone. The process control system is configured to determine the target weight ratio to be between 10 and 45.

The determining to reduce the emissions from FCC unit includes determining one or more of (i), (ii), and (iii) to reduce emissions of SOx, NOx, or both.

The reaction zone includes a downflow type reaction zone.

The approaches described here can have one or more of the following advantages. Yield of light-fraction higher value products, such as desulfurized products, such as gasoline or light-fraction olefins, in a fluid catalytic cracking process, can be increased or maximized while undesirable dry gas emissions are reduced or minimized according to an automated, closed-loop, real-time control process. The automated control process adjusts process parameters or operating conditions rapidly to achieve high product yield and low emissions, while freeing operators to perform other tasks. These approaches to obtaining high yield of light-fraction, higher value, desulfurized products and to reducing emissions can be economically advantageous in an oil refinery that is highly integrated with the petrochemical industry.

The details of one or more implementations are set forth in the accompanying drawings and the description below. Other features and advantages will be apparent from the description and drawings, and from the claims.

DETAILED DESCRIPTION

Figure 1:
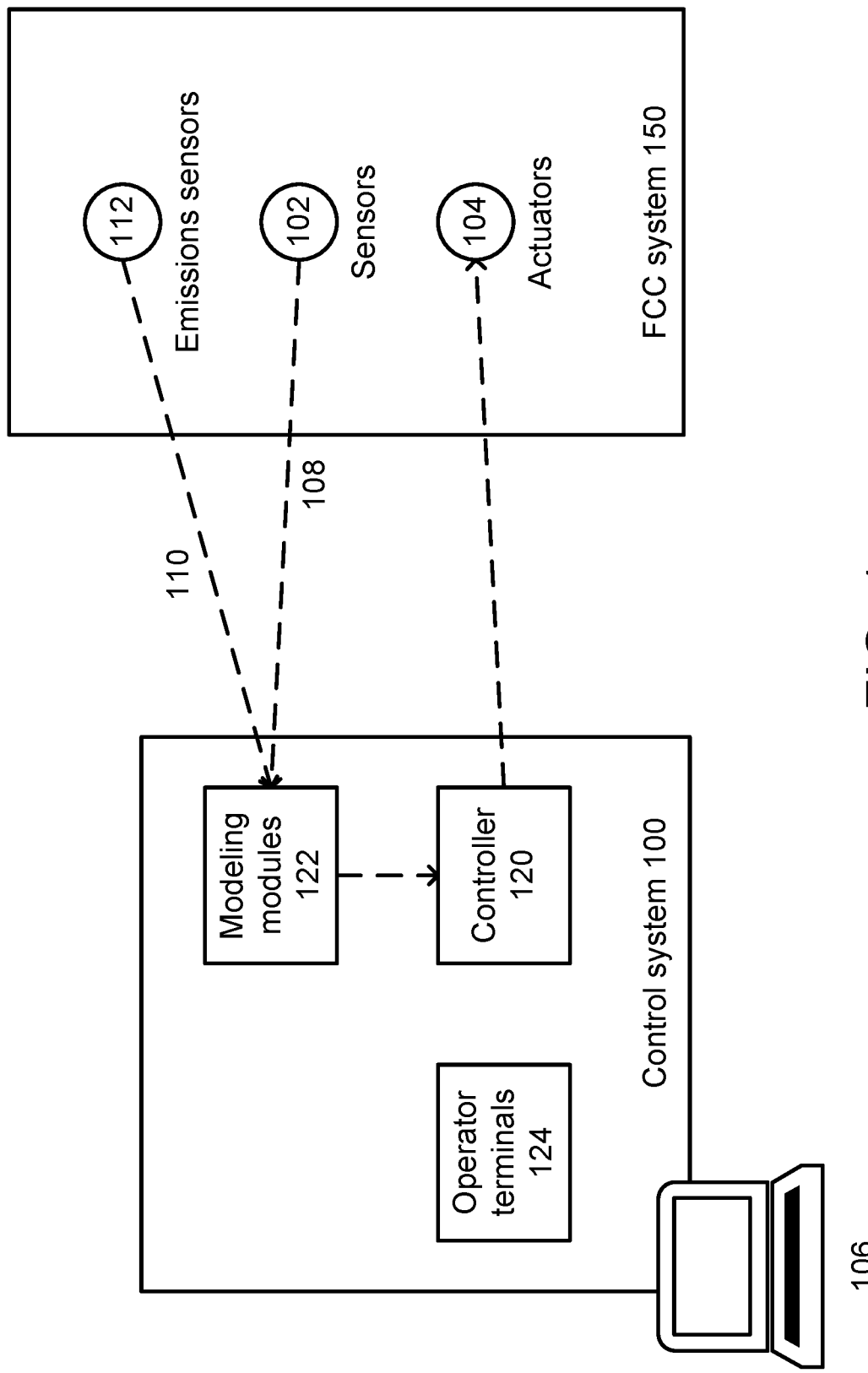
FIG. 1 is a diagram of a control system.

We describe here real-time, closed-loop monitoring, optimization, and control of fluid catalytic cracking (FCC) of petroleum oil into light-fraction higher value products, such as desulfurized products, such as gasoline or light-fraction olefins. The optimization, which is performing using process models developed using real-time or historical data indicative of process parameters or operating conditions or both, is applied to adjust process parameters or operating conditions or both to achieve maximization of the production of light-fraction higher value products and the minimization of unwanted emissions of dry gases such as sulfur oxides (SOx), nitrogen oxides (NOx), carbon monoxide (CO), or carbon dioxide ($CO_2$). For instance, the optimization can adjust process parameters, operating conditions, or both to help ensure complete combustion, thereby minimizing emissions such as CO emissions. The process models are statistical models linking process parameters and operating conditions, and are developed based on actual process data, such as real-time data from a current process, historical data, or both, that indicate process parameters, operating conditions, or both.

In the fluid catalytic cracking (FCC) processes described here, heavy-fraction oil, such as petroleum-derived hydrocarbons, is cracked in the presence of a catalyst or catalyst mixture to produce products including desulfurized light-fraction hydrocarbons such as gasoline and light-fraction olefins. The catalyst mixture can include a base cracking catalyst including a stable Y-type zeolite and small amounts of a rare earth metal oxide. The catalyst mixture can include an additive, such as a CO promoter additive, including a shape selective zeolite. Fluid catalytic cracking can be carried out in an FCC reactor having a regeneration zone, a reaction zone (such as a down flow-type reaction zone), a separation zone, and a stripping zone.

The outputs (such as conversion products) in an FCC process are dependent on process parameters such as catalyst and additive composition, feed parameters (such as feed rate, composition, or quality of feedstock, catalyst, or additive, or other feed parameters) and operating conditions (such as temperatures, pressures, times, or other operating conditions). Process parameters, operating conditions, or both can be adjusted to achieve processing objectives, such as maximization of the production of light-fraction higher value products and the minimization of unwanted emissions of dry gases. This disclosure relates to closed-loop, automated monitoring, optimization, and control processes that monitor and adjust process parameters in real-time (meaning during an ongoing FCC process) according to one or more statistical models to achieve desired objectives, such as a maximization of conversion of petroleum oil to light-fraction higher value products, a minimization of unwanted air emissions, or both. The models can take into account FCC process and system constraints, such as wet gas compressor capacity, fractionation capacity, air blower capacity, reactor temperature, regenerator temperature, catalyst circulation, or other constraints.

The FCC processes are monitored and controlled under closed-loop control processes relying on models, such as predictive analytics models, to optimize one or more outputs of the FCC processes, such as to maximize yield of light-fraction higher value products, minimize emissions, or both. For instance, a control system can implement predictive analytics models to estimate air emission from an FCC process in real time (during the FCC process) based on the actual values of the process parameters and actual operating conditions in the ongoing FCC process. The control system then uses these real time air emissions estimates in conjunction with the predictive analytics models to determine adjustments to one or more process parameters or operating conditions in the FCC process to achieve a desired outcome, such as reduction of unwanted emissions, reduction of energy usage, or increase in yield of desulfurized light-fraction hydrocarbons. In some examples, the control system can employ the predictive analytics models to gauge the health status of elements of the FCC reactor, such as sensors, control valves, pumps, or other elements.

The approaches described here can enable optimization of production conditions, such as reaction times, with a view to production of certain desired end products, such as light-fraction higher value desulfurized products. The approaches described here can provide control functionality that enables appropriate heat balancing to be achieved in an FCC reactor. The approaches described here can enable a systematic, closed-loop, and real-time feedback mechanism that can be employed to optimize catalyst augmentation during the refining process to control the emissions and products composition.

For instance, due to uncertainties in the chemical make-up of the feedstock entering an FCC system, the emissions and the mix of products can sometimes drift from process targets during the course of an FCC refining process. The approaches described here enable remote, real-time monitoring and control, and make use of process models to automatically adjust aspects of the FCC process, such as through catalyst injection, to achieve desired emission and products outputs. In FCC processes, optimum conversion can depend on feed rate, feed quality, set of processing objectives, catalyst, or other parameters, or combinations thereof, subject to constraints such as wet gas compressor capacity, fractionation capacity, air blower capacity, reactor temperature, regenerator temperature, catalyst circulation, or other constraints, or combinations thereof. The approaches described here enable monitoring and automatic control of such parameters with the objective of reducing emissions and optimizing production of light-fraction higher value desulfurized products.

The monitoring, optimization, and control processes described here can be used in conjunction with particular combinations of zeolite catalyst systems for selectively cracking hydrocarbons to produce light higher value products. Advanced control systems are used to optimize the flow of catalyst into the FCC reactor, one or more sensors are used to monitor, in real-time, on-line feed and composition data, and statistical models are utilized to optimize product desulfurization. In a specific example, the monitoring, optimization, and control processes described here are used to monitor and control the injection rate of additive into a regeneration zone of an FCC system to minimize emissions of dry gas such as SOx and NOx.

FIG. 1 shows an example of a control system 100 for monitoring, modeling, optimization, and control of an FCC system 150. The control system 100 can be a distributed control system that uses a network to interconnect sensors 102 and actuators 104 positioned within the process equipment of the FCC system 150 with controllers 120, modeling and optimization modules 122, and operator terminals 124 of the control system 100. The control system 100 includes a computer 106 that is interconnected with one or more other components of the control system 100.

During an FCC process, the control system 100 receives measurement signals 108 from the sensors 102 in the FCC system 150. The sensors can be, for instance, flow sensors, temperature sensors, pressure sensors, chemical composition sensors, or other types of sensors. The measurement signals 108 can be indicative of process parameters in the ongoing FCC process, such as feedstock (such as petroleum oil feedstock) feed rate, feed composition, catalyst feed rate, additive feed rate, or other feed parameters. The measurement signals 108 can be indicative of operating conditions in the ongoing FCC process, such as catalyst levels within the reaction zone, additive levels within the reaction zone, temperatures within the FCC unit (such as riser outlet temperature), operating pressures, ambient temperature, or other operating conditions. The measurement signals 108 can be indicative of outputs from the FCC process, such as products characterization data, for example, composition or amount of the products. The control system 100 also receives emissions signals 110 from emissions sensors 112, with the emissions signals 110 being indicative of air emissions from the FCC process, such as emissions of SOx, NOx, CO, or CO2, or any combination thereof. The emissions sensors 112 can be soft sensors (sometimes also referred to as virtual sensors), which are implemented in software that processes multiple measurements together. In soft sensing technology, interactions of signals can be used to determine or calculate information that was not or cannot be measured. Soft sensing technology can be useful for combining measurements of different characteristics and dynamics, and can be used, for instance, for fault diagnosis and control applications.

The modeling and optimization module 122 develops one or more process models, such as predictive analytics models, that characterize relationships among process parameters, operating conditions, and outputs; refine one or more existing process models; or both. Process models can be developed, refined, or both based on the measurement signals 108, such as based on the feed parameters, the operating conditions, the products characterization data, or any combination thereof. In some examples, one or more process models are developed or refined in real-time, during an ongoing FCC process, based on measurement signals from the ongoing process. In some examples, one or more process models are developed or refined based on historical data collected during one or more previous FCC processes. Development and refinement of process models can be performed using a software package such as Umetric's SIMCA P11.

During an ongoing FCC process, the control system 100 selects a particular model from a set of one or more process models, such as process models developed or refined during that FCC process or during one or more FCC processes. For instance, the control system selects the process model that best represents the current process as indicated by the measurement signals 108, such as the process model that corresponds most closely to the process parameters and operating conditions of the ongoing FCC process. The modeling and optimization module 122 of the control system 100 then optimizes the selected model given the current process parameters, operating conditions, and outputs of the ongoing FCC process to determine adjustments to one or more process parameters, such as feed parameters or operating conditions or both, to achieve maximization of the production of light-fraction higher value products and the minimization of unwanted emissions of dry gases. For instance, the selected process model can be applied to optimize one or more outputs of the process by minimizing mathematical functions that represent the FCC process. Application of process models for determination of process parameter adjustments can be performed, such as by using Matlab (Mathworks Inc.). The controller 120 of the control system 100 then provides control signals 114 to one or more of the actuators 104 in the FCC system, such as flow control valves, to implement the determined adjustments.

The modeling, optimization, and control processes can be implemented using software packages, such as data analytics modeling and optimization software packages, for improvement of throughput and automatic control of continuous processes that have incipient disturbances. Such software packages offer automatic control over continuous processes that are difficult to control. The use of data analytics modeling and optimization can result in increased throughput, reduced or minimized unwanted air emissions, and reduced energy usage through improved process control during normal operation and through avoidance or mitigation of process upsets that could otherwise cause processing to be shut down. The use of data analytics modeling and optimization also demands less manual intervention from FCC unit operators, allowing the operators to focus their attention on higher-level tasks, such as production control activities. For instance, the data analytics modeling and optimization can be implemented with software packages such as Umetric's SIMCA P11 (for developing data analytics models) or Matlab (Mathworks, Inc.) (artificial intelligence and machine learning tools for automation and optimization). In some examples, such software packages provide optimization routines that involve minimization of mathematical functions that represent the FCC process, products, and energy costs.

In some examples, the control system 100 implements Model Predictive Control (MPC), which is an advanced method of process control that uses models to predict how a process such as distillation will react to one or more inputs, such as a change in the amount of heat supplied to the process. MPC relies on empirical models of processes, such as obtained by plant testing, to predict future behavior of dependent variables in dynamic systems based on past responses of one or more independent variables. With MPC, feedback (such as the measurement signals 108 from the sensors 102) from the process that is being controlled can be relied on less because the effects of inputs and changes to the process can be derived or predicted from mathematical empirical models. Feedback (such as the measurement signals 108), such as changes in process conditions responsive to a change in one or more process parameters, deviations from measured values, and MPC predicted values ca be used to correct for inaccuracies in the models. In some examples, MPC relies on linear models of the processes. In some examples, MPC can predict the outcome of adjusting two or more operating parameters concurrently. MPC software is available commercially from suppliers including AspenTech (DMC+), Honeywell (RM-PCT), and Shell Global Solutions (SMOC).

The modeling, optimization, and control processes described here can be employed to maximize production of light higher value products, such as low-sulfur gasoline, such as maximizing products desulfurization per unit of hydrocarbon feed. A cracking catalyst including both large and medium pore, shape-selective zeolite components can be supplied according to control outputs from advanced process control and optimization systems. The FCC feed can be catalytically cracked to produce a cracked material including naphtha and low-sulfur gasoline, and at least a portion of the cracked material can be recovered and recycled as feed, and then catalytically cracked under relatively severe operating conditions into products including additional low-sulfur gasoline.

The modeling, optimization, and control processes described here can be employed to enable an improved catalytic process for the fluid catalytic cracking of petroleum oil, which can produce light-fraction higher value products with a high yield, while producing a diminished amount of dry gases such as gaseous hydrogen, methane, and ethane generated by the thermal cracking of the oil by appropriate process automation and control. FCC cracking can be performed in a downer reactor or down-flow or riser FCC reactor to reduce back mixing, which can be a cause of overcracking, which in turn can result in the formation of dry gas. The reduction of back mixing reduces coke and dry gas formation resulting in increased production of gasoline and low-sulfur gasoline.

Fluid catalytic cracking of a petroleum oil can be performed at a high temperature and at a short contact time by contacting the petroleum oil with a catalyst mixture to result in a high yield of light-fraction higher value products. The catalyst mixture can include a specific base cracking catalyst and an additive containing a shape-selective zeolite. Advanced control systems can be used for monitoring and control to maximize products desulfurization with minimum costs.

Figure 2:
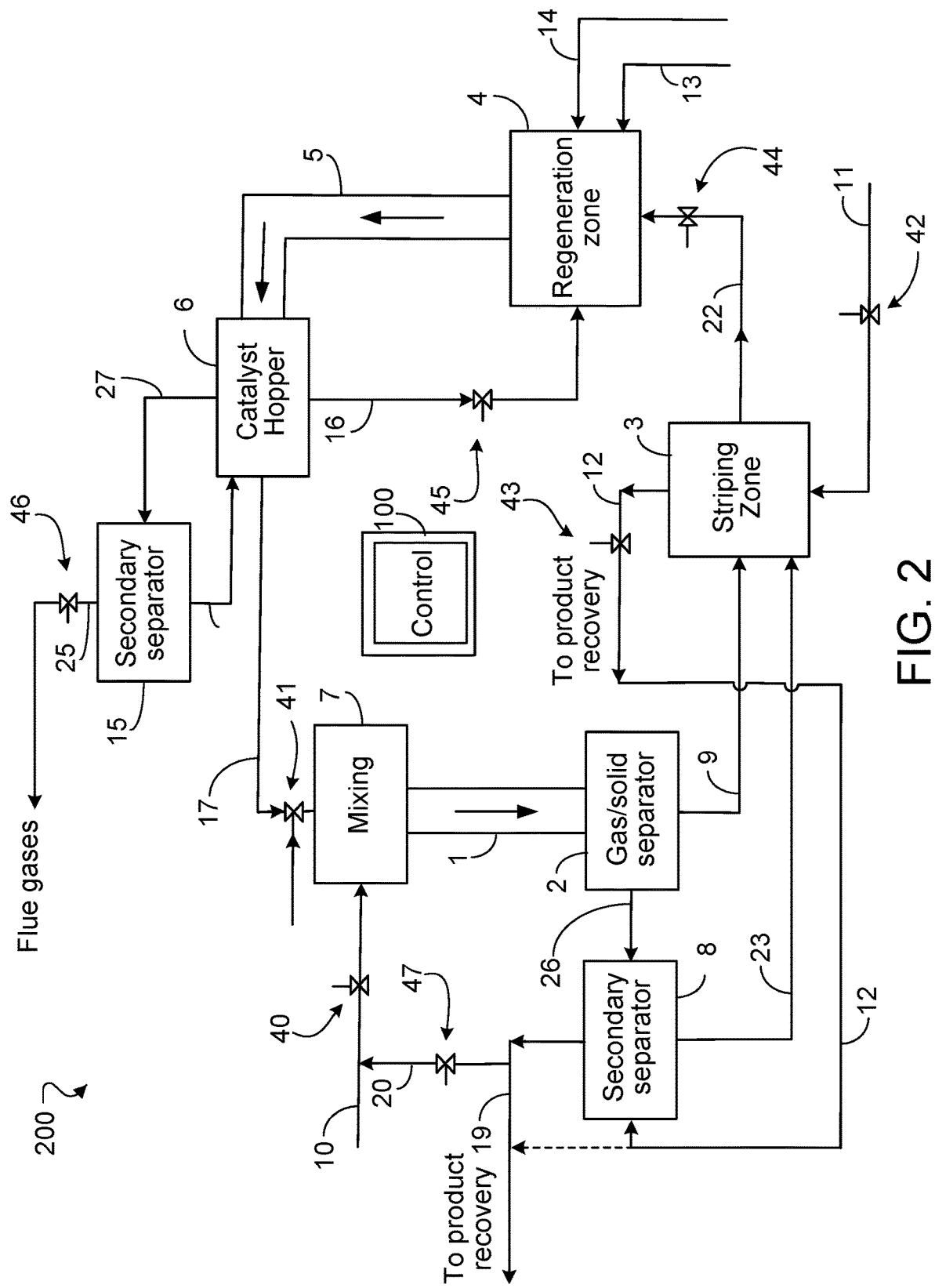
FIG. 2 is a block diagram of a fluid catalytic cracking system.

FIG. 2 is a block diagram of an example FCC system 200 that includes a down-flow type reaction zone 1 (sometimes referred to as a downer reactor or a downer), a gas-solid separation zone 2, a stripping zone 3, and a regeneration zone 4. The FCC system 200 is equipped with one or more sensors for monitoring process parameters, operating conditions, process outputs such as products characterization data, or any combination thereof. The FCC system 200 is integrated with the control system 100 for real-time (such as during an ongoing FCC process) monitoring and control of the FCC process. The FCC system 200 includes devices for controlling catalyst loading and discharge, which devices can be controlled in real-time during an ongoing process by signals from the control system 100 according to the modeling and optimization processes carried out by the control system. In some examples, the FCC reactor can be a riser type FCC reactor rather than the down-flow type FCC reactor discussed here.

In the FCC system 200, hydrocarbon feedstock (such as petroleum oil feedstock) is supplied to a mixing zone 7 via a line 10. The feedstock flowing through line 10 is monitored and controlled by a flow control valve 40 under control by the control system 100. The feedstock from line 10 is mixed in the mixing zone 7 with catalyst, such as regenerated catalyst supplied from a catalyst hopper 6 via a line 17. The flow of catalyst through line 17 is monitored and controlled by a catalyst flow valve 41 under control by the control system 100 according to the modeling and optimization processes carried out by the control system.

The mixture of hydrocarbon feedstock and catalyst falls downward through the reaction zone 1, where the cracking reaction of hydrocarbon oil takes place under high reaction temperatures and at short contact time. The mixture of spent catalyst, unreacted feedstock, and cracked products from the reaction zone 1 enters the gas-solid separation zone 2 located under the reaction zone 1. In some examples, the gas-solid separation zone 2 is a cyclone type of separator. In the separation zone 2, spent catalyst is separation from the cracked products and unreacted feed oil. The catalyst is sent to the stripping zone 3 via a dip leg 9. Hydrocarbon gases separated from most of the spent catalyst are sent to a secondary separator 8 via a line 26, where the remainder of the spent catalyst is separated from the product gas. Hydrocarbon gases are sent via a line 19 to a product recovery section, such as a fractionator.

Catalyst separated by the secondary separator 8 is sent to the stripping zone 3 via a line 23, where heavy hydrocarbons adsorbed on the catalyst are removed with a stripping gas which is introduced to the stripping zone via a line 11. The flow of stripping gas through line 11 is monitored and controlled by a stripping gas flow valve 42 under control by the control system 100 to achieve one or more objectives, such as reduction or minimization of energy and catalyst cost, which is a function of catalyst deactivation, improvement of FCC product quality, increase in FCC unit throughout, or any combination thereof. Steam produced in a boiler, or an inert gas such as nitrogen, pressurized in a compressor, can be used as the stripping gas. The steam or inert gas used in the stripping zone, can be pressurized or heated to a target value calculated using the process models implemented by the control system 100 to achieve one or more of these objectives. The stripping process is carried out at a temperature of between about 500° C. and about 640° C., with a catalyst residence time of between about 1 minute and about 10 minutes. The stripping temperature, time, or both can be determined using the process models implemented by the control system 100 to achieve one or more of these objectives.

Vapors of cracked products and unreacted feed oil stripped from the spent catalyst in the stripping zone 3 are withdrawn through a line 12 located at the top of the stripping zone 3, together with the stripping gas. These gases are sent to the product recovery section, or alternatively to the secondary separator 8. A flow control valve 43 controls the flow of the gases in the line 12 according to the modeling and optimization processes carried out by the control system.

The spent stripped catalyst is transferred from the stripping zone 3 to the regeneration zone 4 via a line 22. The flow along line 22 is monitored and controlled by a flow control valve 44 under control by the control system 100 to achieve one or more objectives, such as reduction or minimization of energy and catalyst cost, improvement of FCC product quality, increase in FCC unit throughout, or any combination thereof. Fresh catalyst can be injected into the system via a line 13, and spent catalyst can be regenerated with a combustion gas (such as an oxygen-containing gas such as air) fed to the regeneration zone 4 through a line 14.

After regeneration of the spent catalyst in the regeneration zone 4, the regenerated catalyst is transferred to a riser-type regenerator 5. The regenerated catalyst from the riser-type regenerator 5 is carried to the catalyst hopper 6 located at the top of the riser type regenerator. The catalyst hopper 6 functions as a gas-solid separator, where the flue gases that contain the by-products of coke combustion can be separated from the regenerated catalyst and removed through a secondary separator 15 (such as a cyclone) via a line 25. Line 25 can include a flow controller valve 46. The secondary separator is supplied via line 27. Catalyst is returned to the catalyst hopper 6 from the secondary separator 15 via a line 24.

A portion of the regenerated catalyst in the catalyst hopper 6 can be returned back to the regeneration zone 4 through a bypass line 16 equipped with a flow controller valve 45. The flow through the bypass line 16 is monitored and controlled by the flow controller valve 45 under control by the control system 100 to achieve one or more objectives, such as reduction (such as minimization) of energy and catalyst cost, which is a function of catalyst deactivation, improvement of FCC product quality, increase in FCC unit throughout, or any combination thereof.

A portion of the FCC product can be taken from line 19, line 12, or both and returned back to the mixing zone 7 via a bypass line 20, which can be equipped with a flow controller valve 47. The flow along the bypass line is monitored and controlled by the flow controller valve 47 under control by the control system 100 to achieve one or more objectives, such as reduction or minimization of energy and catalyst cost, which is a function of catalyst deactivation, improvement of FCC product quality, increase in FCC unit throughout, or any combination thereof.

In the FCC system 200, FCC catalyst circulates through a reaction zone 1, a gas-solid separation zone 2, a stripping zone 3, a regeneration zone 4, a riser-type regenerator 5, a catalyst hopper 6, and a mixing zone 7.

In an example process, for operating an FCC system, such as the FCC system 200, catalyst is injected from a catalyst injection system into a FCC unit designed to maximize production of higher value products. Catalyst is dispensed from a catalyst injection system into an FCC unit, an output in the FCC unit is sensed, and an amount of catalyst dispensed is automatically adjusted in response to the sensed output using process models developed by the control system and computations from an optimization routine executed by the control system to achieve one or more of the following: (a) reduction or minimization of energy and catalyst cost; (b) increase or maximization of value added products concentration; and (c) increase unit throughput.

In some examples, one or more sensors can be placed in the FCC system to monitor catalyst particles and provide on-line, real-time measurement of various reaction conditions or properties, such as reaction temperature, reaction pressure, flow rates, catalyst particle size, chemical composition of fluid streams, regeneration zone temperatures and pressures, or other conditions or properties. The sensors can be operatively linked to the control system to enable sensed data to be used in the development of process models linking, for example, the particle size with the remaining process variables. The developed process models relating the various properties can be used to, for instance, optimize the dosage of catalyst and stripping gas in order to optimize production of higher value products.

In some examples, preheated feedstock such as hydrocarbon oil, vacuum gas oil, or naphtha, can be charged to the mixing zone 7 via line 10, which is controlled by the flow control valve 40. The feed flow through the flow control valve 40 is a control variable. The control and optimization strategy implemented by the control system 100 can change the value of this flow target, such as to allow more feed to the FCC unit, subject to process constraints, such as valve openings, pressure and temperature limits, and FCC product specifications. The feed of feedstock on line 10 is mixed with regenerated catalyst from the catalyst hopper 6 in the mixing zone 7. The amount of catalyst injected in the mixing zone 7 can be controlled using a flow controller on line 17. The flow of catalyst can be optimized using process models developed by the control system 100 according to an optimization strategy, such as designed to achieve one or more of the following: (a) reduction or minimization of energy and catalyst cost; (b) improvement of FCC product quality; and (c) increase unit throughput.

In some examples, process control implemented by the control system 100, in monitoring outputs under different process conditions, can record a "fingerprint" of normal operations. The system can then detect deviations from the fingerprint. For instance, a database of fingerprints can be generated and used to predict what is happening to the machine. Historical data can be used to test a predictive system can provide early warning of potential equipment failure in the FCC system, for instance, enabling early detection of problems.

The approaches to process monitoring and control, such as process optimization in real time, can optimize conversion and the yield of higher value products with low, such as minimized, energy input. For instance, the approaches to process monitoring and control described here can result in an increase in yield of about 2%, an increase in throughput, a reduction of about 10% in production variability, and a reduction in energy usage of about 3% as compared to processes without such process monitoring and control.

In a specific example, a process for the fluid catalytic cracking of petroleum oil includes maintaining between about 55 wt. % and about 95 wt. % of a base cracking catalyst containing a stable Y-type zeolite, with less than about 0.6 wt % of rare-earth metal oxide, and between about 5 wt. % and about 40 wt % of an additive containing a shape-selective zeolite and about 10 wt % of a phosphorus-containing component activated ex situ, calculated as $P_2O_5$ based on the total amount of higher value products-selective zeolite. The method includes reacting the mixture at between about 500° C. and about 650° C. for a duration in the range of about 0.05 to about 1.2 seconds in a down-flow or riser type of FCC apparatus having a regeneration zone, a separation zone and a stripping zone. The method includes controlling the fresh catalysts federate by a process control. The method includes separating the part of product streams and recycling a part of the unconverted material mixed with the feed stream. The method includes monitoring the feeds and products characterization data and operating conditions on-line (in real-time) and continuously. The method includes developing process models based on the observations obtained by the monitoring. The method includes comparing process performance by the model prediction. The method includes adjusting the operating conditions to yield optimize products desulfurization using the models relied on in the comparison.

The reaction zone outlet temperature can be greater than about 500° C. The contact time of hydrocarbons in the reaction zone can be in the range of about 0.05 to about 1.5 seconds. The feedstock composition, product composition and operating conditions can be monitored and utilized to develop one or more process model which can then be used to maximize value added products yield. The FCC apparatus can be operated with a catalyst/oil ratio of between about 10 and about 42 wt/wt. The rare-earth metal oxide content in the base cracking catalyst can be less than about 0.6 wt. %, such as less than about 0.08 wt. %. The zeolite content in the base cracking catalyst can be in the range of about 5 to about 55 wt. %. ZSM-5 can be an additive. The petroleum oil can include naphtha, crude oil, deasphalted oil, vacuum gas oil, gas oil, petroleum residua, and the corresponding hydrotreated products, and mixtures thereof.

In an example process for producing at least one light higher value products product, a feedstock that includes a hydrocarbon mixture is contacted at a temperature of over 525° C. and a pressure of 1 to 5 atmospheres. Cracking catalyst is mixed, the cracking catalyst including a ZSM-5 zeolite catalyst which contains about 0.5 to about 10 wt. % phosphorus and about 0.1 to about 10 wt. % of a promoter metal. The on-line reactor conditions are maintained guided by a process controller designed to optimize products desulfurization.

In some examples, multiple sensing equipment can analyze feedstock and product yield composition on-line. Optimum processing conditions can be determined by process models and optimization routines.

An example process for the fluid catalytic cracking of petroleum oil is provided, wherein the petroleum oil includes naphtha. The process includes contacting the oil with a cracking catalyst mixture and reacting the mixture in an FCC apparatus having a regeneration zone, a separation zone and a stripping zone, with a temperature in the range of about 525° C. to about 650° C., the catalyst/oil ratio in the range of about 10 to about 42 wt/wt, and the contact time of hydrocarbons in the reaction zone in the range of about 0.05 to about 1.2 sec. The fresh catalysts feed rate in the mixture, feed and product characterization data, and operating process conditions data are monitored and used to develop process models and controlled optimization routines for different operating regimes. The models are adjusted and modified by the of use of historical process data with a goal to maximize the yield of desulfurization products at a minimum operating cos. At least a portion the lighter naphtha cracked material mixed with feed is separated, recovered, and recycled, and catalytically cracked into products including additional low-sulfur gasoline, with a goal to maximize the yield of products desulfurization at a minimum operating cost.

The feedstock composition, product composition and operating conditions can be monitored and utilized to develop statistical models which can then be applied to maximize value added products yield. The extent of recycling of the unconverted material can be estimated by the process models.

An example process for the fluid catalytic cracking of petroleum oil is provided, wherein the petroleum oil includes petroleum heavy oil. The petroleum oil is contacted with a catalyst mixture including a base cracking catalyst containing a stable Y-type zeolite and rare-earth metal oxide, and an additive containing a shape-selective zeolite. The mixture is contacted in an FCC apparatus having a regeneration zone, a separation zone and a stripping zone. The mixture is heated under conditions that the reaction zone outlet temperature is in the range of about 500° C. to about 650° C. The catalyst feed rate, feed oil, and product yield and characterization data are monitored remotely and in real-time as a function of operating process conditions, and the monitored data are used for developing process control models for different operating regimes. The models are refined by the of use of data obtained from process testing, such as process testing that includes deviating from normal process conditions to develop resulting process data with a goal of maximizing the yield of products desulfurization at a minimum operating cost. At least a portion of the uncracked material mixed with feed oil is separated, recovered, and recycled, and then catalytically cracked into products including additional low-sulfur gasoline. The process is provided with a system for injecting catalyst, the system including a least one catalyst injection apparatus and at least one sensor configured to enable determination of the composition of the value added products product stream produced in the FCC unit. The system includes a controller coupled to the sensor, for controlling the catalyst injection system in response to sensed data and based on models and computations from the optimization routine, to achieve minimize energy and catalyst costs while maximizing FCC product quality and throughput.

In an example process for the fluid catalytic cracking of a heavy-fraction oil, the oil is contacted with a catalyst mixture including about 60 to about 95 wt % of a base cracking catalyst containing a stable Y-type zeolite and less than about 0.5 wt % of rare-earth metal oxide, and about 5 to about 40 wt % of an additive containing a shape-selective zeolite. The contact between the oil and the catalyst mixture takes place in an FCC apparatus having a regeneration zone, a down low-type reaction zone, a separation zone and a stripping zone, and under conditions that the reaction zone outlet temperature is in the range of about 580° C. to about 630° C., the catalyst/oil ratio is in the range of about 10 to about 45 wt/wt, and the contact time of hydrocarbons in the reaction zone is in the range of about 0.1 to about 1.5 second. The fresh catalyst feed rate, feed oil rate, and product characterization data as functions of operating process conditions are remotely monitored on-line in real-time, and the resulting data are used to develop different process models for different operating regimes. The models are validated by process testing with a goal to maximize the yield of products desulfurization at a minimum operating cost. The process includes separating, recovering and recycling of at least a portion of the unconverted material mixed with feed, which is then catalytically cracked into products including additional low-sulfur gasoline. The recycling is optimized by the use of the process model. The process is equipped with a system for injecting fresh catalyst which includes at least one catalyst injection apparatus and at least one sensor configured to determine the composition of a higher value products stream produced in the FCC unit. The system includes a controller coupled to the sensor, for controlling the additions made by the catalyst injection system in response to the metric provided by the sensor with a goal to maximize the yield of products desulfurization at a minimum operating cost.

The heavy fraction oil can be heavy crude oil, deasphalted oil, vacuum gas oil, petroleum residua, and the corresponding hydrotreated products, and mixtures thereof.

In an example process for the fluid catalytic cracking of petroleum oil, such as petroleum gas oil or heavy oil, the oil is contacted with a catalyst mixture including a base cracking catalyst containing a stable Y-type zeolite and rare-earth metal oxide, and an additive containing a shape-selective zeolite. The mixture of oil and catalyst mixture is introduced into a fluid catalytic cracking apparatus having a regeneration zone, a separation zone and a stripping zone. The mixture is cracked under conditions that the reaction zone outlet temperature is in the range of 500° C. to 650° C. The feed rate, feed, and product characterization data are monitored remotely, on-line, and in real time as a function of operating process conditions. The resulting data are for developing statistical process models for different operating regimes. The use of historical process data with a goal to maximize the yield of products desulfurization at a minimum operating cost.

At least a portion of the unconverted cracked material can be recycled and ultimately catalytically cracked into products including additional low-sulfur gasoline. The process can be provided with a system for injecting catalyst which includes a catalyst injection system apparatus and at least one sensor adapted to provide an indication of the composition of a product stream produced in the catalyst cracking unit. A process model, such as an optimization process model, can be applied to produce results relied on for controlling the additions made by the catalyst injection system. The petroleum oil can be naphtha, crude oil, deasphalted oil, vacuum gas oil, petroleum residua, and the corresponding hydrotreated products, and the mixtures thereof.

In an example process for the fluid catalytic cracking of heavy fraction oils, the heavy fraction oils to a down flow reaction zone inlet to bring the heavy fraction oils into contact with a regenerated catalyst, with the catalytic cracking being carried out under conditions of a contact time of about 0.1 to about 3.0 sec, a reaction zone outlet temperature over about 500° C. and a catalyst/oil ratio of about 10 to about 50 wt/wt to obtain a mixture of cracked product, unreacted material and spent catalyst. Spent catalyst is separated from the mixture, and the hydrocarbon is stripped from the catalyst in a stripping zone. The regenerated catalyst is obtained in a regeneration zone and recycled at the reaction zone inlet. The mixture is cracked under conditions that the reaction zone outlet temperature is in the range of about 500° C. to about 650° C. The feed rate, feed and product characterization data are monitored remotely, on-line, and in real-time as a function of operating process conditions, and the resulting data are used for developing process models for different operating regimes. The models are refined by the of use historical process data with a goal to maximize the yield of products desulfurization at a minimum operating cost. At least a portion of the unconverted cracked material mixed with feed and ultimately catalytically cracked into products including additional low-sulfur gasoline. The process is provided with a system for injecting catalyst which includes at least one catalyst injection apparatus and at least one sensor configured to provide a composition of a product stream generated in the catalyst cracking unit. The system includes a controller coupled to the sensor, for controlling the fresh catalyst injection system in response to the metric provided by the sensor. For instance, an opening of the catalyst addition flow control valve is determined by a signal that is calculated in a control system control loop with an aim to optimize products desulfurization.

The petroleum oil can be naphtha, crude oil, deasphalted oil, vacuum gas oil, petroleum residua, and the corresponding hydrotreated products, and the mixtures thereof.

In an example process for the fluid catalytic cracking of heavy fraction oils, the heavy fraction oils are provided to a down flow reaction zone inlet to bring the heavy fraction oils into contact with a regenerated catalyst. The catalytic cracking is carried out under conditions of a contact time of about 0.1 to about 3.0 sec, a reaction zone outlet temperature over about 500° C. and a catalyst/oil ratio of about 10 to about 50 wt/wt to obtain a mixture of cracked product, unreacted material and spent catalyst. Spent catalyst is separated from the mixture, and hydrocarbon is stripped from the catalyst in a stripping zone. The regenerated catalyst is obtained in a regeneration zone and recycled at the reaction zone inlet. The mixture is cracked under conditions that the reaction zone outlet temperature is in the range of about 500° C. to about 650° C. The feed rate, feed and product characterization data are monitored remotely, on-line, and in real-time as a function of operating process conditions. The resulting data are used for developing process models for different operating regimes. The models are refined by the of use historical process data and plant testing with a goal to maximize the yield of products desulfurization at a minimum operating cost. At least a portion of the unconverted cracked material mixed with feed is recycled and ultimately catalytically cracked into products comprising additional low-sulfur gasoline. The process is provided with a system for injecting catalyst which includes at least one catalyst injection apparatus and at least one sensor configured to provide a indicative of the composition of a product stream produced in the catalyst cracking unit. The system includes a controller coupled to the sensor, for controlling the additions made by the catalyst injection system in response to the metric provided by the sensor. The process includes optimizing one or more fluid cracking process variables to maximize the quality of higher value products and feed flow by the use of advanced, closed-loop, control strategy and an on-line sensor which is used to analyze the FCC products. The advanced control uses one or more sensed variables, actuator positions, process models, and economic variables including unit feed cost, intermediate products, steam unit cost, catalyst cost and other parameters related to the cost of operation.

The petroleum oil can be naphtha, crude oil, deasphalted oil, vacuum gas oil, petroleum residua, and the corresponding hydrotreated products, and the mixtures thereof. A particle size sensor can be provided to monitor, on-line and in real-time, the size of FCC spent catalyst, with data from the sensor being used by the control system to develop process models linking particles size with other process variables. The particle size signal can be used by the control system to optimize the dosage of catalyst, stripping gas, or both to optimize the production of higher value products.

Figure 3:
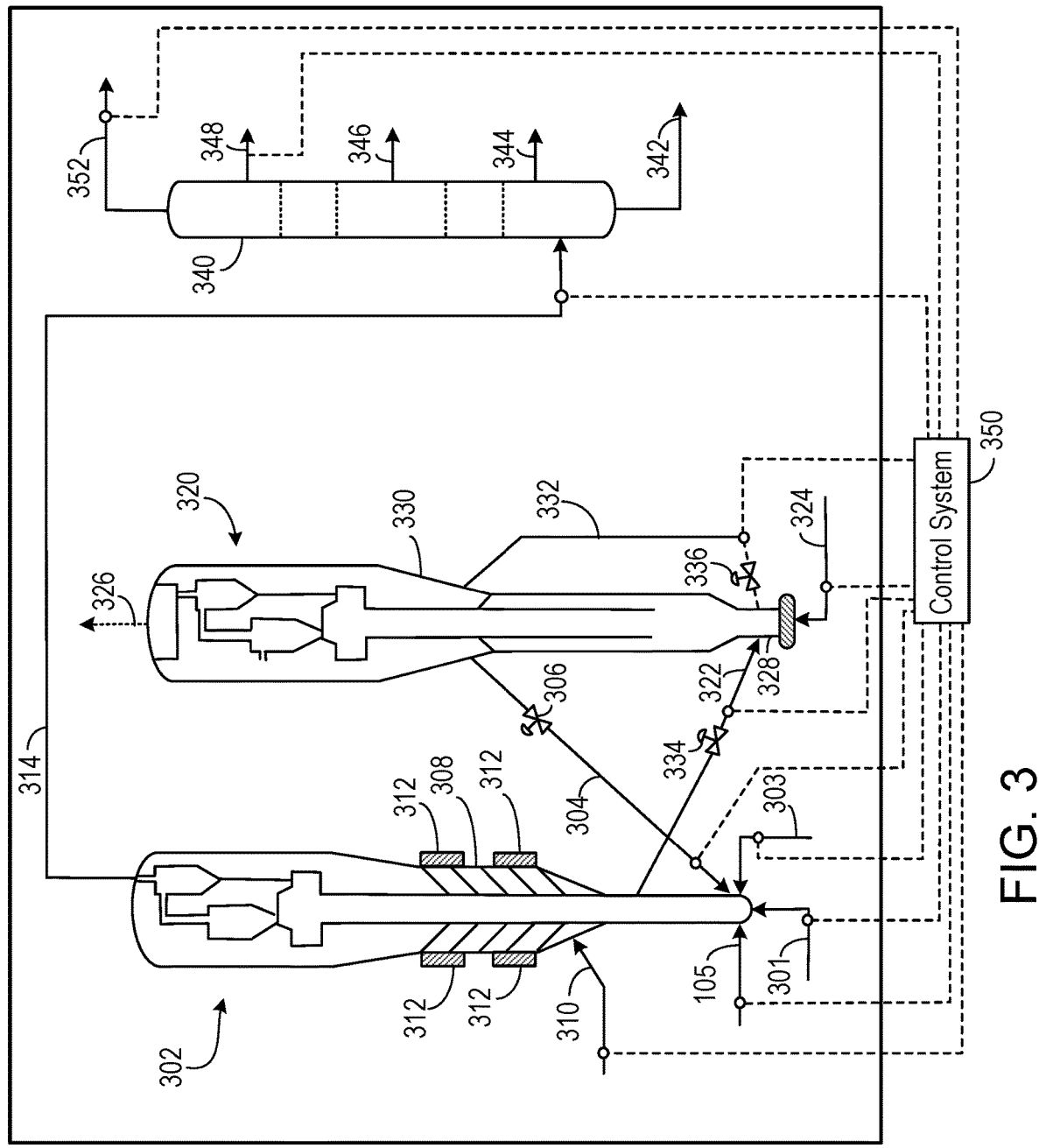
FIG. 3 is a diagram of a fluid catalytic cracking system.

Referring to FIG. 3, the monitoring, control, and optimization processes can be implemented in an FCC system 300 that includes a reaction zone 302, a stripper 308, a regeneration zone 320. The FCC system 300 operates under control by a control system 350, that receives measurement signals from one or more sensors positioned in the FCC system, such as signals indicative of process parameters, operating conditions, outputs (such as products characterization data), or any combination thereof. The control system 350 sends control signals to one or more actuators, such as valves, to adjust process parameters or operating conditions or both to achieve maximization of the production of light-fraction higher value products and the minimization of unwanted emissions of dry gases.

In operation, hydrocarbon feedstock 301 is supplied to the bottom of the reaction zone 302 of the FCC unit 300. Hot FCC catalyst is supplied to the reaction zone 302. For instance, fresh FCC catalyst can be supplied via a line 303, or regenerated FCC catalyst can be supplied via a line 304. The line 304 can include a regenerated FCC catalyst control valve 306. Additionally, an FCC additive can be supplied to the reaction zone 302 via a line 305, which can be controlled by a control valve (not shown). In some examples, the process operates without a lift gas, and the FCC catalyst moves from a regeneration zone 320 to the reaction zone 302 by control of the pressure differential between the two locations. In some examples, a lift gas is introduced near the liquid and solid feed inlets into the reaction zone 302.

In the reaction zone 302, hydrocarbon feedstock 301 vaporizes and forms a dilute phase suspension with the FCC catalyst and the FCC additive. The dilute phase suspension passes up through the reaction zone 302, which can generally get wider to accommodate volumetric expansion. Cracked FCC products and coked FCC catalyst can then pass into a solid-vapor separator, such as a conventional cyclone.

A stripper 308 strips entrained hydrocarbons from the FCC catalyst. A conventional stripping steam can be added via a line 310. In some examples, the stripper 308 can include a microwave or a sonic stripping section 312, which can include multiple microwave or sonic sources configured to apply energy radially to the stripping section 312. The stripper 308 can be lined with a material that internally reflects the selected microwave or sonic radiation, thereby helping to ensure that the microwave or sonic energy is used for the hydrocarbons and undesirable heteroatoms, such as sulfur and nitrogen containing compounds, and also helping to ensure that the microwave or sonic energy is not wasted in heating of the stripper vessel. In some examples, a majority of the microwave or sonic energy is applied in a relatively dense phase region of stripper 108, which permits a longer residence time.

In some examples, the stripper 308 can include a multi-stage microwave or sonic stripper that has the ability to remove stripped products at multiple points in the stripping operation. The ability to selectively heat hydrocarbons and/or sulfur and nitrogen containing compounds allows for the use of shorter stripping residence time. Stripping techniques previously used, for example, to de-water paper pulp can be used in catalytic stripping processes. For instance, after applying microwave energy, the FCC catalyst can be passed over relatively large cross-sectional area surfaces with an applied vacuum on one side of the surface to assist in the stripping operation. Porous stainless steel filters can be used. In some examples, annular flow of the FCC catalyst around a porous stainless steel filter can be employed to strip hydrocarbons or sulfur and nitrogen compounds from catalyst.

Cracked products and stripper effluent vapors combine in the reaction zone to form a product mixture. The product mixture is supplied from the reaction zone 302 to a fractionation column 340 by a line 314. Spent FCC catalyst that can include coke is withdrawn from the reaction zone 302 via a line 322 and supplied to an FCC catalyst regeneration zone 320. The flow rate of spent FCC catalyst from the reaction zone 302 to the FCC catalyst regeneration zone 320 can be controlled using a spent FCC catalyst control valve 334. FCC catalyst can be regenerated, for example, by contacting the spent FCC catalyst with a regeneration gas 324, such as an oxygen-containing gas, such as air. Flue gas can be withdrawn from the regeneration zone 320 via a line 326. During regeneration, FCC catalyst circulates from a coke combustor 328 to a dense catalyst bed 330 in the regeneration zone 320. At least a portion of the FCC catalyst can be recycled from the dense catalyst bed 330 to the base of the coke combustor 328 via a line 332, and the rate of recycle can be controlled by a valve 336.

In the fractionation column 340, the product mixture is separated into products such as a heavy, slurry oil stream 342, heavy cycle oil 344, light cycle oil 346, naphtha 348, and a light overhead stream 352. The light overhead stream 352 is rich in C2-C4 olefins, C1-C4 saturates, and other light cracked gas components. The light overhead stream 352 can be treated in an unsaturated gas plant to recover various light gas streams such as C3-C4 LPG or C2-fuel gas. Conventional operating conditions can be employed in the fractionation column 340. For example, the product mixture can be preheated to a temperature of between about 150° C. and 375° C. before being supplied to the fractionation column 340.

In some examples, one or more control valves in the FCC system 300, such as one or more of valves 306, 334, and 336, and an FCC additive control valve, can each be independently communicatively and operatively coupled to the control system 350, thereby allowing for control of the flow rates of their respective streams. In some examples, each of one or more of the input streams is fitted with a sensor for sampling of the flow characteristics of the respective streams. The sensors can be configured to measure one or more of the flow rate, temperature, and physical properties of the respective streams. The sensors can be operatively coupled to the control system 350, as demonstrated by the dashed lines.

Figure 4:
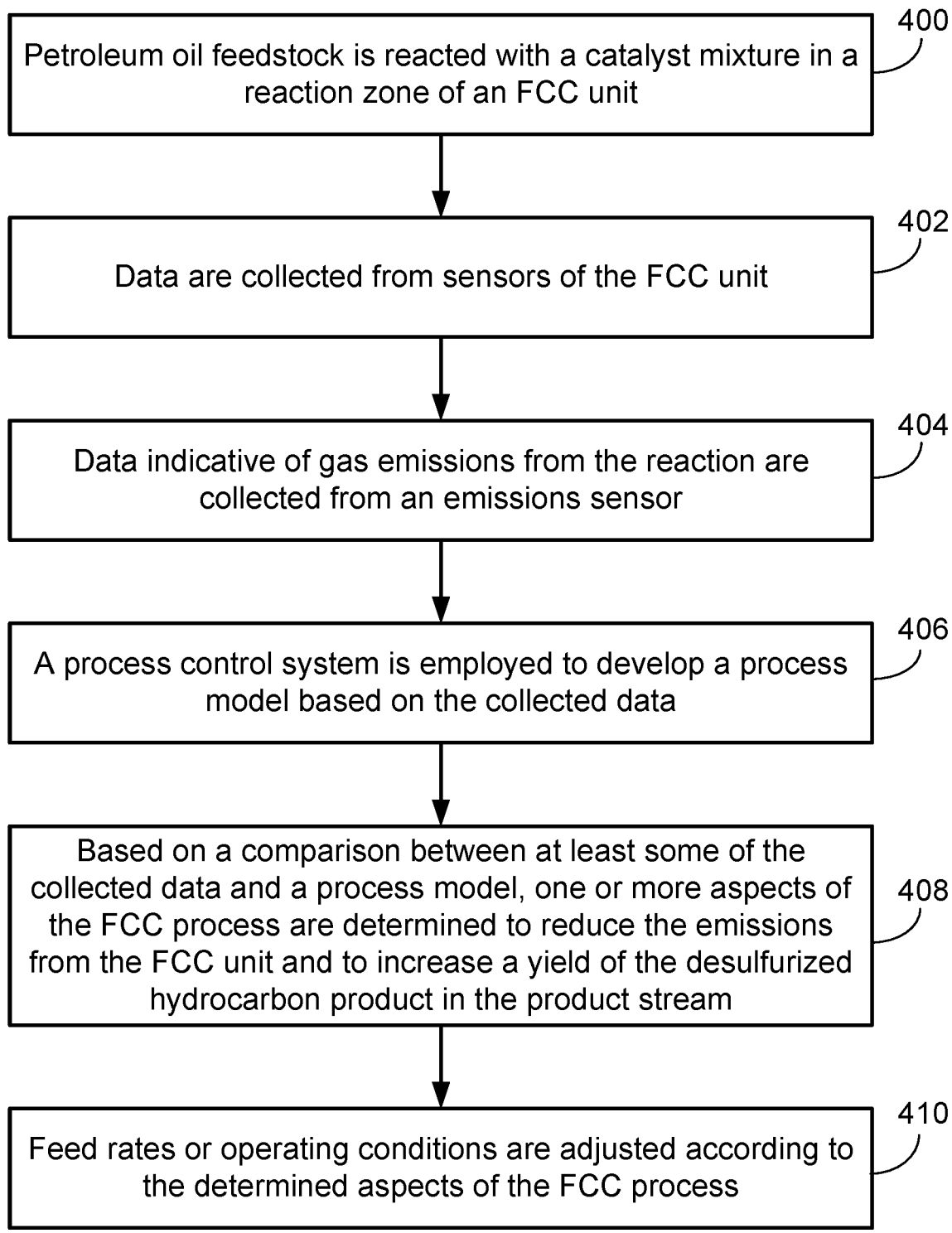
FIG. 4 is a flow chart.

Referring to FIG. 4, in an example process for fluid catalytic cracking of petroleum oil feedstock, petroleum oil feedstock is reacted with a catalyst mixture in a reaction zone of an FCC unit (400). The reacting produces a product stream including desulfurized hydrocarbon product, unreacted petroleum oil feedstock, and spent catalyst. The catalyst mixture includes a base cracking catalyst including a stable Y-type zeolite and a rare earth metal oxide, and an FCC additive including a shape selective zeolite.

During the reacting, data are continuously collected from sensors of the FCC unit (402). The data are indicative of one or more of (i) a feed rate of one or more of the base cracking catalyst, the FCC additive into the reaction zone, and the petroleum oil feedstock, (ii) operating conditions of the reaction in the reaction zone, or (iii) a composition of the product stream. In addition, data indicative of gas emissions from the reaction are collected from an emissions sensor (404).

During the reacting, a process control system including one or more processors is employed to develop a process model based on at least some of the collected data (406). The process model characterizes a relationship among the feed rates, the operating conditions, the composition of the product stream, and emissions from the FCC unit.

During the reacting, based on a comparison between at least some of the collected data and the developed process model or a previously developed process model the process control system is used to determine one or more aspects of the FCC process to reduce the emissions from the FCC unit and to increase a yield of the desulfurized hydrocarbon product in the product stream (408). The aspects include one or more of (i) a target feed rate of the base cracking catalyst, (ii) a target feed rate of the FCC additive, (iii) one or more target operating conditions of the reaction in the reaction zone.

One or more of (i) the feed rate of the base cracking catalyst according to the determined target feed rate of the base cracking catalyst, (ii) the feed rate of the FCC additive according to the determined target feed rate of the FCC additive, or (iii) the operating conditions is adjusted according to the determined one or more target operating conditions (440).

In some examples, petroleum oil is used as the feed oil for the fluid catalytic cracking processes described here. Petroleum oil feedstock can include naphtha, crude oil, deasphalted oil, straight-run gas oil, vacuum gas oil, gas oil, petroleum residue, atmospheric residue, vacuum residue, coker gas oil, or petroleum oils obtained by hydrofining or hydrotreating the aforementioned residues or gas oils, or a combination of any two or more of them. Petroleum oil can also include a minor portion of light fraction oil.

The FCC feed (such as petroleum oil) can be catalytically cracked to produce a cracked material that includes naphtha and low-sulfur gasoline, with recovery and recycle of at least a portion of the naphtha cracked material as feed into a downer for further catalytic cracking into products, including additional propylene. In some examples, the naphtha cracked material passed into the downer includes the entire naphtha fraction. In some examples, more propylene-containing light olefins can be produced per unit of naphtha cracked feed passed into additional reactor units.

In some examples, FCC feed can be heavy oil or residue which is more difficult to crack compared to naphtha feedstock, for example, and generally is processed at a higher temperature. For a given feedstock type, for example, olefinic naphtha versus paraffinic naphtha, the latter is hard to crack and is processed at a high temperature.

In some examples, the feedstock for the FCC processes described here can be naphtha. Naphtha is as hydrocarbon feedstock that includes hydrocarbons having about three to about twenty carbon atoms. In some examples, naphtha feedstock includes paraffinic and isoparaffinic hydrocarbons having about four to about eleven carbon atoms per molecule. In some examples, various hydrocarbons such as gas oil (boiling range 260° C.-340° C.), fuel oil with a boiling point above 340° C., or residue or the corresponding hydrotreated materials can serve as suitable feedstocks.

In some examples, the hydrocarbon feedstock can include a certain amount of sulfur content. Most hydrocarbon oil, depending on pretreatment and processing, contains sulfur at a concentration of less than one percent. The FCC processes described here can convert sulfur-containing hydrocarbons into value added products, such as low-sulfur gasoline.

The feedstock flows into a reactor containing a catalyst, such as a pentasil zeolite catalyst. The presence of higher value products in the system can be beneficial as these compounds can promote free radical reactions.

The physical and chemical properties of an FCC catalyst contribute to the increased conversion through the selectivity of the catalyst. These properties include, for instance, zeolite type, pore size distribution, relative matrix to total surface area, and chemical composition. The amount of catalyst used, such as the ratio of catalyst to petroleum oil, can be significant to result in high levels of production of higher value products, such as products having two to three carbon atoms per molecule.

In some examples, products desulfurization by an FCC unit employing a large pore zeolite cracking catalyst can produce more value added products by adding a cracker riser/downer and a medium pore zeolite catalytic component to the unit, and recycling at least a portion of the cracked material to the cracker riser/downer. For instance, the FCC catalyst can include large pore size zeolite components, such as USY zeolites, and medium pore size zeolite components, such as ZSM-5. The large pore size zeolite can include a faujasite type, such as a Y type faujasite. The FCC catalyst can include at least 1 wt. % of the medium pore size zeolite component.

In some examples, the FCC catalyst can include a porous, inorganic refractory metal oxide as a binder. For instance, the FCC catalyst can include particles having the large pore size zeolite with a porous, inorganic refractory metal oxide binder, and particles having the medium pore size zeolite with a porous, inorganic refractory metal oxide binder. The binder can have acid cracking functionality for cracking heavier components of the FCC feed. In some examples, the FCC catalyst can include about 0.1 wt. % to about 10 wt. % of a promoter metal, such as gallium, germanium, tin, or a combinations thereof.

In some examples, the FCC catalyst can include about 0.5 wt. % to about 10 wt. % phosphorous, such as a phosphorous-containing compound. For instance, the FCC catalyst can include 0.5 wt. % to about 10 wt. % of $P_2O_5$ based on the total amount of olefin-selective zeolite, to contribute to proper selectivity to light higher value products. After treatment with the phosphorus-containing compound, the phosphorous treated zeolite that is selective to higher value products can be dried and calcined at a temperature between 300° C. and 1000° C., such as between 450° C. and 700° C., for about 15 minutes to 24 hours, to prepare the higher value products-selective cracking catalyst.

The catalysts, on which carbonaceous materials and a portion of heavy hydrocarbons may be deposited, are forwarded from the stripping zone to the regenerating zone of the FCC unit. In the regenerating zone, the catalysts, on which the carbonaceous materials and the like are deposited, are subjected to oxidation treatment to decrease the amount of the deposits, thereby obtaining regenerated catalysts. These regenerated catalysts are continuously recycled back to the reaction zone. The cracked products are quenched just upstream of, or just downstream of, the separator, to avoid unnecessary further cracking or excessive cracking.

In some examples, the catalyst mixture includes a base cracking catalyst and an additive. The base cracking catalyst can include a stable Y-type zeolite which is the main active component of the base catalyst, and a matrix which is a substrate material for the zeolite. The base cracking catalyst can include less than about 10 wt. %, such as less than about 0.5 wt. %, of rare earth metal oxide, that can be mainly included in the stable Y-type zeolite. Generally, the catalytic activity of stable Y-type zeolites increases as the rare-earth metal content in the zeolites increases because thermal stability of the Y-type zeolite is improved by the incorporation of rare-earth metal into the zeolites. Hydrogen transfer reaction activity of Y-type zeolites can also be increased by adding rare-earth metal to the zeolites. The content of the stable Y-type zeolite in the base cracking catalyst used in the FCC processes described here is in a range of about 5 wt. % to about 50 wt. %, such as about 15 wt. % to about 40 wt. %. The term "stable" Y-type zeolite encompasses "ultrastable" zeolitic materials.

The matrix of the base cracking catalyst used in the FCC processes described here can include clays such as kaolin, montmorilonite, or bentonite, or combinations thereof; and inorganic porous oxides such as alumina, silica, magnesia, or silica-alumina, or combinations thereof. The base cracking catalyst can have a bulk density of about 0.5 g/mL to about 1.0 g/mL, an average particle diameter of about 50 microns to about 90 microns, a surface area of about 50 m$^2$/g to about 350 m$^2$/g, and a pore volume of about 0.05 mL/g to about 0.5 mL/g.

The catalyst mixture contains, in addition to the base cracking catalyst, an additive containing a shape-selective zeolite. A shape-selective zeolite is a zeolite having a pore diameter smaller than that of the Y-type zeolite, so that only hydrocarbons of certain shapes can enter the shape-selective zeolite through its pores. Example shape-selective zeolites include ZSM-5, omega, SAPO-5, and aluminosilicates. The content of the shape-selective zeolite in the additive can be in the range of about 20 wt. % to about 70 wt. %, such as about 30 wt. % to about 60 wt. %.

The additive containing the shape-selective zeolite can be a CO promoter to assist in combustion of CO to CO2 in the regenerator. CO promoters can accelerate CO combustion in the regenerator's dense phase, reducing or minimizing higher temperature excursions which can occur as a result of afterburning in the dilute phase and across the cyclones. CO promoters can enhance uniform burning of coke, particularly if there is an uneven distribution of spent catalyst within the regenerator contacting the combustion air. Regenerators operating in full or partial combustion mode can often realize the benefits of a CO promoter.

The base cracking catalyst can be present in the catalyst mixture in a range of about 55 wt. % to about 95 wt. % and the additive can be present in the catalyst mixture in a range of about 5 wt. % to about 40 wt. %. If the percentage of the base cracking catalyst is less than a first catalyst threshold, such as less than about 55 wt. %, or the percentage of additive is greater than a first additive threshold, such as greater than about 40 wt. %, high light-fraction higher value products yield can be difficult to obtain because of low conversion of the feed oil. If the percentage of the base cracking catalyst is greater than a second catalyst threshold, such as greater than about 95 wt. %, or the percentage of the additive is less than a second additive threshold, such as less than about 5 wt. %, high light-fraction higher value products yield can be difficult to obtain, while high conversion of the feed oil can be achieved. In a specific example, the catalyst contains at least about 0.5 wt. % phosphorous, such as between about 0.5 wt. % and about 10 wt. % phosphorous, such as $P_2O_5$.

Suitable catalysts include the catalyst PRIME-G, LGS 550 (available from Intrcat), or HPCL.

The following is a discussion of some of the process parameters and operating conditions that can be monitored, adjusted, or both, by the monitoring and control processes described here.

Catalyst/Oil Ratio. The concentration of catalyst in the reactor, sometimes referred to as the catalyst/oil ratio, can affect the conversion; increasing the catalyst/oil ratio increases the availability of cracking for increased conversion. The catalyst/oil ratio can be increased by increasing reactor heat load or switching to a lower coke selective (such as lower delta coke) catalyst. Reactor heat load can be raised by increased reactor temperature or lower feed rate, which in turn increases the catalyst/oil ratio to maintain the FCC unit in heat balance. The catalyst/oil ratio in the FCC processes described here, in terms of the ratio of the amount of catalyst mixture recycled (tons/hour) to the feed rate of the feed oil (tons/hour), can be between about 10 wt/wt and about 50 wt/wt, such as between about 10 wt/wt and about 45 wt/wt.

Catalyst can be added to the FCC unit, such as continuously, periodically, or on a predefined schedule. Using the closed loop monitoring and control processes described here, the fresh catalyst addition rate can be monitored and controlled, for instance to achieve a target performance, such as maximization of the production of light-fraction higher value products and the minimization of unwanted emissions of dry gases. For instance, due to uncertainties associated with the FCC process, such as the chemical composition of the petroleum oil feedstock or other compositional variations of materials entering the FCC system, the emissions, energy use, or product mix of the FCC process may vary from process targets during the course of the FCC process. Using the closed loop monitoring and control processes described here, the catalyst addition rate can be monitored and controlled, such as by process models taking into account the compositional variations of materials entering the FCC system, to achieve a target performance.

Reaction Time. An increase in reaction time available for cracking also increases conversion. For a given FCC unit configuration, fresh feed rate, riser steam rate, recycle rate, and pressure are example operating variables that affect reaction time. Conversion varies inversely with the rate due to limited reactor size available for cracking. For instance, conversion has been observed in some units to increase by only 1% absolute for a 3-5% relative decrease in fresh feed rate. As used herein, reaction time (sometimes also referred to as contact time) means either the time between the start of contact of the feed oil with the regenerated catalysts and the separation of the produced cracked products from the catalysts, or, the time between the start of contact of the feed oil with the regenerated catalysts and the quenching, in the case that the produced cracked products are quenched just upstream of the separation zone. In some examples, the reaction time is between about 0.1 seconds and about 1.5 seconds, such as between about 0.2 seconds and about 0.9 seconds. If the reaction time is less than a first threshold, such as less than about 0.1 seconds, then the yield of light-fraction higher value products can be low because of low conversion of the heavy fraction oil. Conversely, if the reaction time is longer than a second threshold, such as about 1.5 seconds, then the thermal cracking of petroleum oil fed can be excessive, thereby excessively increasing the amount of dry gases generated. Reaction time is dependent on the feed system, and the optimum reaction time to achieve a target performed can be predicted by the monitoring and control processes described here.

Reactor Temperature. Increased reactor temperature increases unit conversion, such as through a higher rate of reaction for the endothermic cracking reaction and also by increasing catalyst/oil ratio. For instance, an increase of about 10° F. in reactor temperature can increase conversion by about 1-2% absolute. Higher reactor temperature also increases gasoline octane and LPG higher value products, such as due to the higher rate of primary cracking reactions relative to secondary hydrogen transfer reactions which saturate higher value products in the gasoline boiling range and lower gasoline octane. Generally, an increase of approximately 10° F. in reactor temperature can give up to a 0.8 and 0.4 number increases in research and motor octane, respectively.

The reactor temperature is measured and controlled by the reaction outlet temperature, which refers to the outlet temperature of the down flow type reaction zone, and is the temperature before separation of the cracked products from the catalysts. The reaction zone outlet temperature can be at least about 500° C., such as between about 500° C. and about 630° C., such as between about 590° C. and about 620° C. If the reaction zone outlet temperature is less than a first threshold, such as less than about 580° C., then the yield of light-fraction higher value products from is generally low. If the reaction zone outlet temperature is greater than a second threshold, such as greater than about 630° C., then the thermal cracking of heavy fraction oil can be significant, thereby excessively increasing the amount of dry gases generated. If naphtha is the feedstock for a particular application, the reactor temperature can be lowered compared to residue cracking to optimized products desulfurization. The reactor temperature is dependent on the feed system and the optimum reactor temperature to achieve a target performed can be predicted by the monitoring and control processes described here.

Pressure. Higher conversion and coke yield are thermodynamically favored at higher pressures; however, the conversion is generally not significantly affected by FCC unit pressure given that a significant increase in conversion generally entails a substantial increase in pressure. In some examples, the FCC unit is operated at a reaction pressure of between about 1 atm and about 5 atm, such as between about 1 $kg/cm^2$ and about 3 $kg/cm^2$. In some examples, the FCC unit is operated with a regeneration zone temperature of between about 650° C. and about 720° C.

In a specific example, an FCC process involves contacting petroleum oil feedstock with a cracking catalyst mixture. The cracking catalyst mixture includes between about 55 wt. % and about 95 wt. % of a base cracking catalyst including a stable Y-type zeolite and less than about 0.6 wt. % of a rare earth metal oxide. The cracking catalyst mixture also includes between about 5 wt. % and about 45 wt. % of an additive including a shape-selective zeolite, and up to about 10 wt. % of a phosphorus-containing compound. The cracking catalyst mixture and the petroleum oil feedstock are reacted in a reaction zone of an FCC unit maintained at a temperature of between about 500° C. and about 650° C., for a contact time of between about 0.05 seconds and about 3.0 seconds, to obtain a mixture of product stream, unreacted oil feedstock, and spent catalyst. The product stream is separated from the spent catalyst and unreacted oil feedstock and collected.

The addition of petroleum oil feedstock and catalyst to the reaction zone is controlled by a process control, such as the real-time, closed-loop monitoring, optimization, and control processes described supra. The process control involves continuously monitoring feed parameters, products characterization data, and operating conditions, and developing process models based on those feed parameters, products characterization data, and operating conditions. Performance of the FCC process is compared to the process models, and feed parameters, operating conditions, or both are adjusted according to an objective of achieving complete combustion and minimization of unwanted air emissions, such as CO emissions. In some examples, the feed parameters, products characterization data, and operation conditions can be monitored and used to develop process models, which can then be applied for optimization of process outputs, such as to increase or maximize yield of value added products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for fluid catalytic cracking (FCC) of petroleum oil feedstock, the method comprising:

reacting the petroleum oil feedstock with a catalyst mixture in a reaction zone of an FCC unit to obtain a product stream comprising desulfurized hydrocarbon product, unreacted petroleum oil feedstock, and spent catalyst, the catalyst mixture comprising:
  a base cracking catalyst comprising a stable Y-type zeolite and a rare earth metal oxide, and
  an FCC additive comprising a shape selective zeolite;
during the reacting, collecting, from sensors of the FCC unit, data indicative of one or more of (i) a feed rate of one or more of the base cracking catalyst, the FCC additive, or the petroleum oil feedstock, (ii) operating conditions of the reaction in the reaction zone, or (iii) a composition of the product stream;
during the reacting, collecting, from an emissions sensor, data indicative of gas emissions from the reaction;
during the reacting, developing, by a process control system comprising one or more processors, a process model based on at least some of the collected data, in which the process model characterizes a relationship among the feed rate of the base cracking catalyst, the feed rate of the FCC additive, the operating conditions, the composition of the product stream, and emissions from the reaction;
during the reacting, based on a comparison between at least some of the collected data and the developed process model or a previously developed process model, determining, by the process control system, one or more of (i) a target feed rate of the base cracking catalyst, (ii) a target feed rate of the FCC additive, and (iii) one or more target operating conditions of the reaction in the reaction zone to reduce the emissions from the FCC unit and to increase a yield of the desulfurized hydrocarbon product in the product stream;
adjusting one or more of (i) the feed rate of the base cracking catalyst according to the determined target feed rate of the base cracking catalyst, (ii) the feed rate of the FCC additive according to the determined target feed rate of the FCC additive, or (iii) the operating conditions according to the determined one or more target operating conditions.

2. The method of claim 1, in which the catalyst mixture comprises between 55 wt. % and 95 wt. % of the base cracking catalyst and between 5 wt. % and 45 wt. % of the FCC additive.

3. The method of claim 1, in which the base cracking catalyst comprises less than 0.5 wt. % of the rare earth metal oxide.

4. The method of claim 1, in which the catalyst mixture comprises a phosphorous-containing compound.

5. The method of claim 1, in which the FCC additive comprises ZSM-5.

6. The method of claim 1, in which determining one or more target operating conditions of the reaction comprises determining a target reaction zone outlet temperature.

7. The method of claim 6, comprising determining the target reaction zone outlet temperature to be between 500° C. and 650° C.

8. The method of claim 7, comprising determining the target reaction zone outlet temperature to be between 580° C. and 630° C.

9. The method of claim 1, in which determining one or more target operating conditions of the reaction comprises determining a target contact time for contact between the petroleum oil feedstock and the catalyst mixture in the reaction zone.

10. The method of claim 9, comprising determining the target contact time to be between 0.05 seconds and 3.0 seconds.

11. The method of claim 10, comprising determining the target contact time to be between 0.1 and 1.5 seconds.

12. The method of claim 1, in which determining the target feed rate of the base cracking catalyst comprises determining a target weight ratio of the base cracking catalyst to the petroleum oil feedstock in the reaction zone.

13. The method of claim 12, comprising determining the target weight ratio to be between 10 and 45.

14. The method of claim 1, in which the determining to reduce the emissions from FCC unit comprises determining one or more of (i), (ii), and (iii) to reduce emissions of SOx, NOx, or both.

15. The method of claim 1, comprising developing the process mode based on a temperature of a regeneration zone of the FCC unit.

16. The method of claim 1, comprising determining, based on the comparison, a target temperature of a regeneration zone of the FCC unit.

17. The method of claim 1, comprising developing one or more of the process models based further on historical data collected from sensors of the FCC unit.

18. The method of claim 1, comprising reacting the petroleum oil feedstock with the catalyst mixture in a downflow type reaction zone.

19. The method of claim 1, comprising separating the desulfurized hydrocarbon product from the unreacted petroleum oil feedstock and the spent catalyst in a separation zone of the FCC unit.

20. The method of claim 1, comprising recycling the unreacted petroleum oil feedstock to the reaction zone.

* * * * *